(12) United States Patent
Bhuiyan et al.

(10) Patent No.: US 11,231,940 B2
(45) Date of Patent: Jan. 25, 2022

(54) SYSTEM AND METHOD FOR AUTOMATIC RECOVERY OF INFORMATION HANDLING SYSTEMS

(71) Applicant: DELL PRODUCTS, LP, Round Rock, TX (US)

(72) Inventors: Ruhull Alam Bhuiyan, Austin, TX (US); Allen Chester Wynn, Round Rock, TX (US); Carl C. McAdams, Round Rock, TX (US); Gregory Alan Havenga, Lakeway, TX (US); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 169 days.

(21) Appl. No.: 16/584,048

(22) Filed: Sep. 26, 2019

(65) Prior Publication Data

US 2021/0096880 A1    Apr. 1, 2021

(51) Int. Cl.

| | |
|---|---|
| *G06F 9/44* | (2018.01) |
| *G06F 21/78* | (2013.01) |
| *G06F 11/14* | (2006.01) |
| *G06F 9/445* | (2018.01) |
| *G06F 21/57* | (2013.01) |
| *G06F 9/4401* | (2018.01) |

(52) U.S. Cl.
CPC ........ *G06F 9/44505* (2013.01); *G06F 9/4401* (2013.01); *G06F 11/1469* (2013.01); *G06F 21/575* (2013.01); *G06F 21/78* (2013.01); *G06F 2201/82* (2013.01); *G06F 2221/033* (2013.01)

(58) Field of Classification Search
CPC .... G06F 9/44505; G06F 21/575; G06F 21/78; G06F 11/1469; G06F 9/4401; G06F 2201/82; G06F 2221/033
USPC ................................................ 713/1, 2, 100
See application file for complete search history.

(56) References Cited

U.S. PATENT DOCUMENTS

| | | | |
|---|---|---|---|
| 6,721,881 B1 * | 4/2004 | Bian | G06F 9/4411 710/104 |
| 6,983,362 B1 * | 1/2006 | Kidder | G06F 11/0709 707/999.002 |
| 7,577,829 B2 | 8/2009 | Dennis | |
| 8,214,541 B2 | 7/2012 | Bolen et al. | |
| 8,504,811 B2 | 8/2013 | Yang et al. | |
| 2003/0204711 A1 * | 10/2003 | Guess | G06F 9/44505 713/1 |

(Continued)

OTHER PUBLICATIONS

U.S. Appl. No. 16/053,426, filed Aug. 2, 2018.

*Primary Examiner* — Michael J Brown
(74) *Attorney, Agent, or Firm* — Larson Newman, LLP

(57) ABSTRACT

An information handling system includes a non-volatile memory and a processor configured to determine whether a previous boot of the information handling system was successful while booting the information handling system. If the previous boot of the information handling system was successful, then the processor determines whether current configuration settings of the information handling system match most recent known good configuration settings. If the current configuration settings of the information handling system do not match the most recent known good configuration settings, then the current configuration settings are stored as a most recent restore point in the memory.

18 Claims, 4 Drawing Sheets

(56) References Cited

U.S. PATENT DOCUMENTS

| | | | |
|---|---|---|---|
| 2010/0185844 A1* | 7/2010 | George | G06F 9/4418 713/2 |
| 2012/0297178 A1 | 11/2012 | Peng et al. | |
| 2015/0370576 A1 | 12/2015 | Wynn | |
| 2016/0364250 A1 | 12/2016 | Seibert et al. | |
| 2019/0278508 A1 | 9/2019 | Pepper et al. | |

* cited by examiner

SYSTEM AND METHOD FOR AUTOMATIC RECOVERY OF INFORMATION HANDLING SYSTEMS

FIELD OF THE DISCLOSURE

The present disclosure generally relates to information handling systems, and more particularly relates to automatic recovery of information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a non-volatile memory and a processor configured to determine whether a previous boot of the information handling system was successful while booting the information handling system. If the previous boot of the information handling system was successful, then the processor may determine whether current configuration settings of the information handling system match most recent known good configuration settings. If the current configuration settings of the information handling system do not match the most recent known good configuration settings, then the current configuration settings can be stored as a most recent restore point in the memory.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
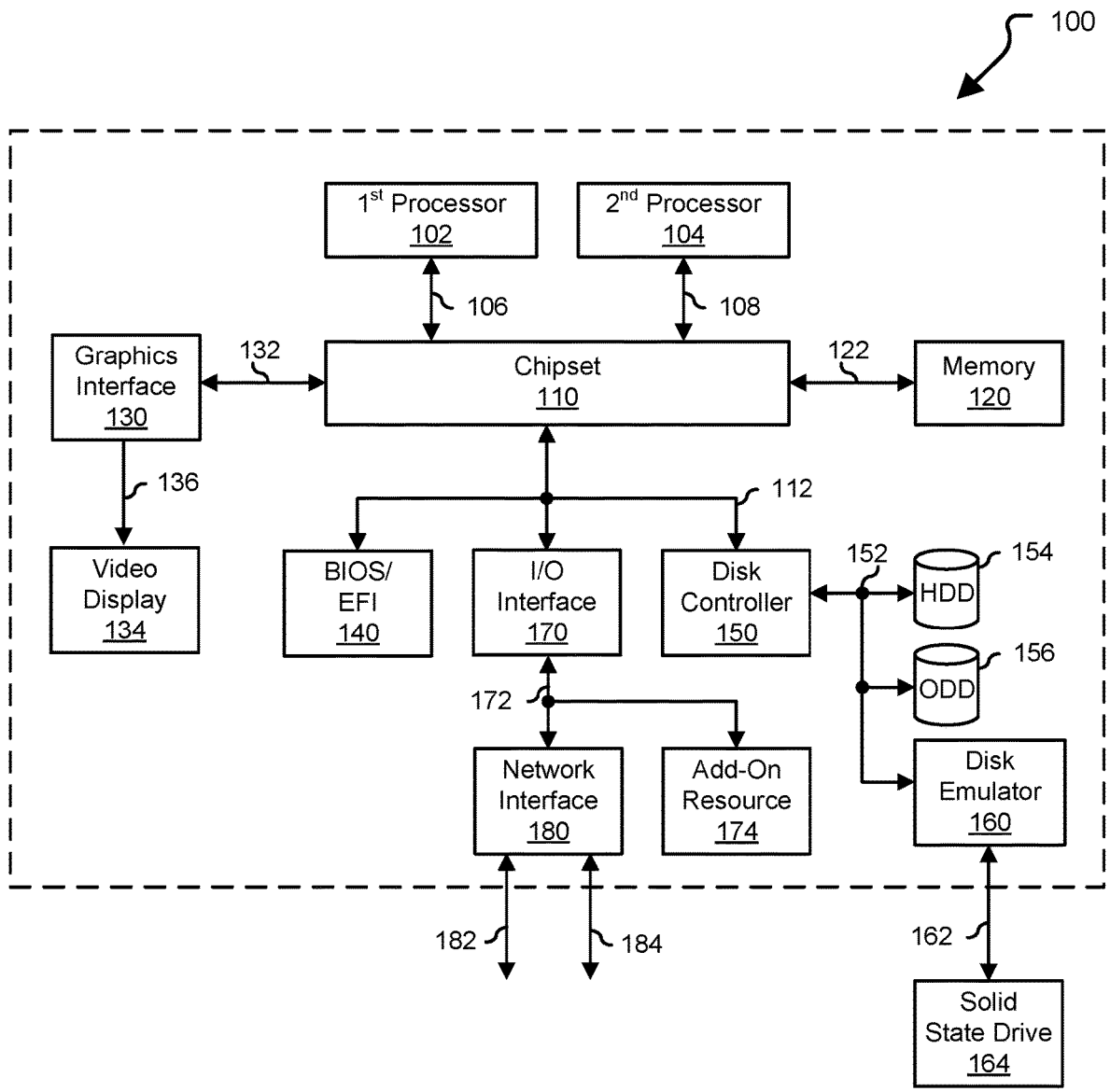
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132 and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

An end user, an operating system (OS), an OS-level application, etc. may change BIOS settings or other boot sensitive NV-RAM variables. The BIOS settings and the other boot-sensitive NV-RAM variables may also be referred to as configuration settings. At times, these changes may cause a boot failure. The current disclosure provides a technical improvement in that an end user of an information handling system can store multiple configuration settings to automatically recover from the boot failure. In another embodiment, the end user may be automatically presented with multiple restore points during the boot failure. As used herein, a restore point is a state of the information handling system that can be reverted to, wherein the restore point is associated with a specific set of configuration settings. The system and method may also present the differences between the multiple restore points allowing the end user to determine a desired state of the information handling system. The end user may then select which one of the restore points may be used during the recovery.

Figure 2:
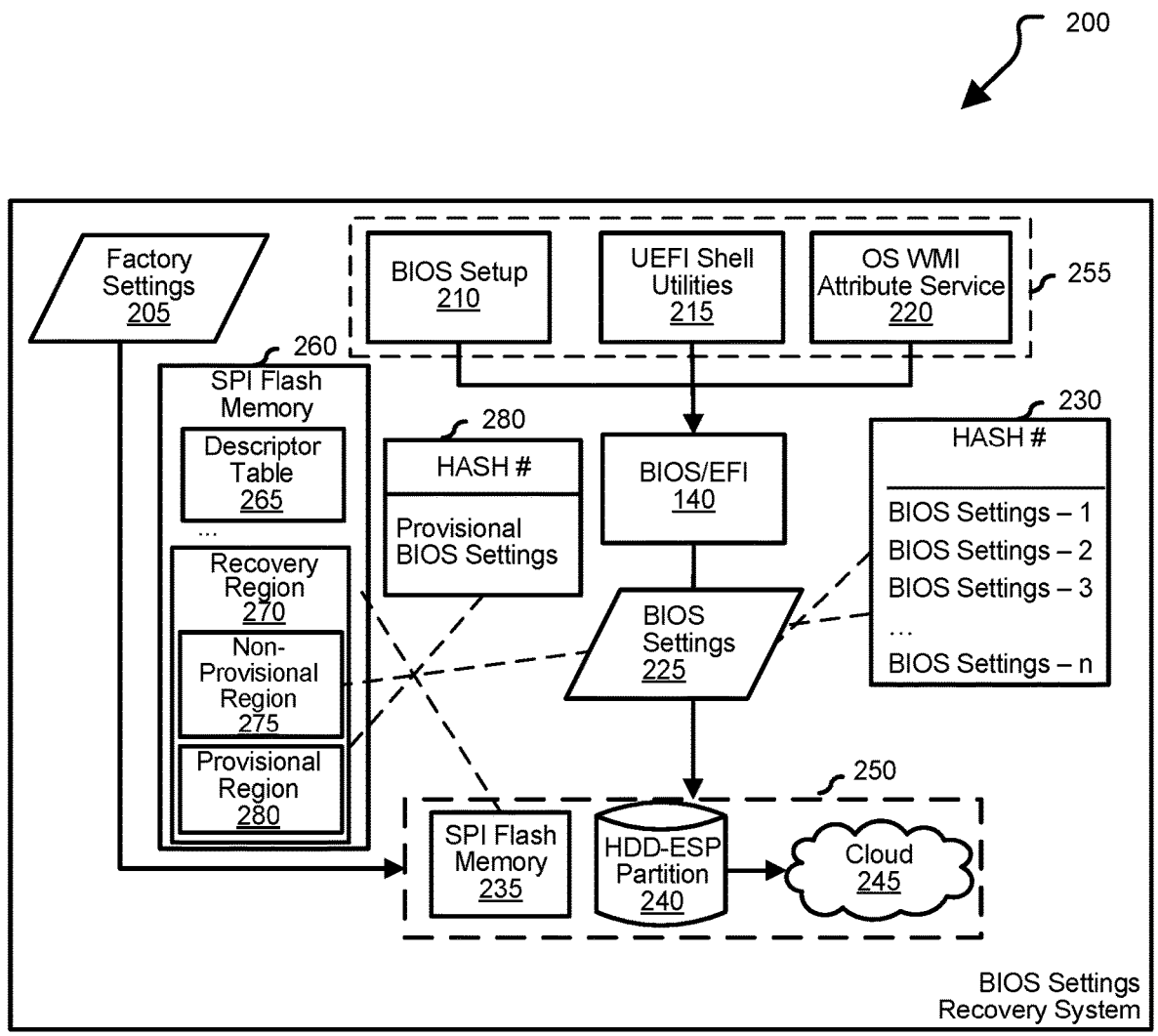
FIG. 2 is a flow diagram illustrating a system for automatic recovery of an information handling system.

FIG. 2 illustrates a BIOS settings recovery system 200 that includes factory settings 205, BIOS/EFI 140, sources 255, and storage options 250. Sources 255 include one or more sources of changes to configuration settings such as a BIOS setup 210, a unified extensible firmware interface (UEFI) shell utilities 215, and OS Windows® management instrumentation (WMI) attribute service 220. Storage options 250 may be used to store BIOS settings 225 which include a serial peripheral interface (SPI) flash 235, an HDD-extensible firmware interface system partition (ESP) 240, and a cloud 245.

BIOS settings recovery system 200 provides a system and method to store known good backup copies of the configuration settings. In another embodiment, BIOS settings recovery system 200 may be configured to store deltas of the configuration settings instead of storing backup copies of the configuration settings. For example, BIOS settings recovery system 200 may store deltas between current configuration settings and most recent known good configuration settings. The most recent known good configuration settings may also be referred to as last known good configuration settings. BIOS settings recovery system 200 may be further configured to store a hash of a stored known good backup copy of the configuration settings or the deltas of the configuration settings in an NV-RAM variable. The NV-RAM variable may include various attributes such as a date/time attribute and a success/failure indicator attribute. The date/time attribute may be set to the date/time the backup copy or the deltas of the configuration settings were stored. The success/failure indicator attribute may be set to indicate whether the stored backup copy or deltas configuration settings is "bad" or invalid. For example, the success/failure indicator may be set to bad if the information handling system failed to boot using the associated configuration settings.

If the information handling system fails to boot and the configuration settings of the information handling system have changed, one of the known good backup copies of the configuration settings such as the most recent known good backup copy may be used to restore the configuration settings to a known good state and attempt to successfully boot the information handling system. In another embodiment, instead of storing the known good backup copies of the configuration settings, deltas between the most recent known good configuration settings and the current configuration settings may be stored. A restore point interface such as an integrated or external display may be used to display information associated with the restore points to an end user. The restore point interface may provide access to the restore points so that a selected restore point can be applied in the event of a boot failure or corruption of the configuration settings. For instance, if corruption of the information handling system's configuration settings is detected a most recent known good or a selected restore point configuration settings may be automatically applied to support boot of the information handling system. In one embodiment, if only one valid restore point is stored, the configuration settings of that restore point are automatically applied as default without a prompt to the end user.

Factory settings 205 include configuration settings used at shipment of the information handling system from its manufacturer. During boot of the information handling system, BIOS setup 210 reports system information which can be used to configure the BIOS settings. UEFI shell utilities 215 is a collection of utilities that provide system diagnostic information. OS WMI attribute service 220 provides an end user with information about the status of the information handling system. OS WMI attribute service 220 may also be configured to provide an interface for configuration systems, setting and changing permissions for authorized users and user groups, scheduling processes, etc.

BIOS/EFI 140 can store known good configuration or BIOS settings 225 in one or more storage options of storage options 250 such as SPI flash memory 235. As shown, BIOS settings 225 may also be stored in HDD-ESP 240 which can be uploaded to cloud 245. HDD-ESP 240 is a partition in the HDD that stores EFI boot loaders. Having multiple storage locations allow for a guarantee that a known good copy of BIOS settings 225 is available in case the information handling system incurred a boot failure. BIOS settings 230 shows a more detailed illustration of BIOS settings 225. A section of BIOS settings 230 stores a hash of the BIOS settings such as BIOS settings −1 through BIOS settings −n. An example of a BIOS setting includes ACPI suspend state, password information, IP address, DNS information, etc.

SPI flash memory 235 is an NV-RAM where BIOS is generally stored. SPI flash memory 260 is a more detailed illustration of SPI flash memory 235. SPI flash memory 260 may be divided into several sections such as a descriptor 265 and a recovery region 270 is a secured and tamper proof location in SPI flash memory 260 which includes a non-provisional region 275 and a provisional region 280. Descriptor 265 is a location in SPI flash memory 260 where access rights are configured. Non-provisional region 275 is where known good configuration settings such as BIOS settings 230 are stored. Provisional region 280 is where provisional configuration settings such as BIOS settings 280 are stored. Provisional configuration settings are configuration settings that have not yet been verified to be good. For example, the information handling system has not yet successfully booted using the aforementioned configuration settings. BIOS settings 280 may be good or bad configuration settings. If determined to be good configuration settings, then BIOS settings 280 may be added to BIOS settings 230 and/or stored at non-provisional region 275. Otherwise, BIOS settings 280 may be flagged as "bad." BIOS settings flagged as bad may be deleted during garbage collection or subsequent reboot.

Figure 3:
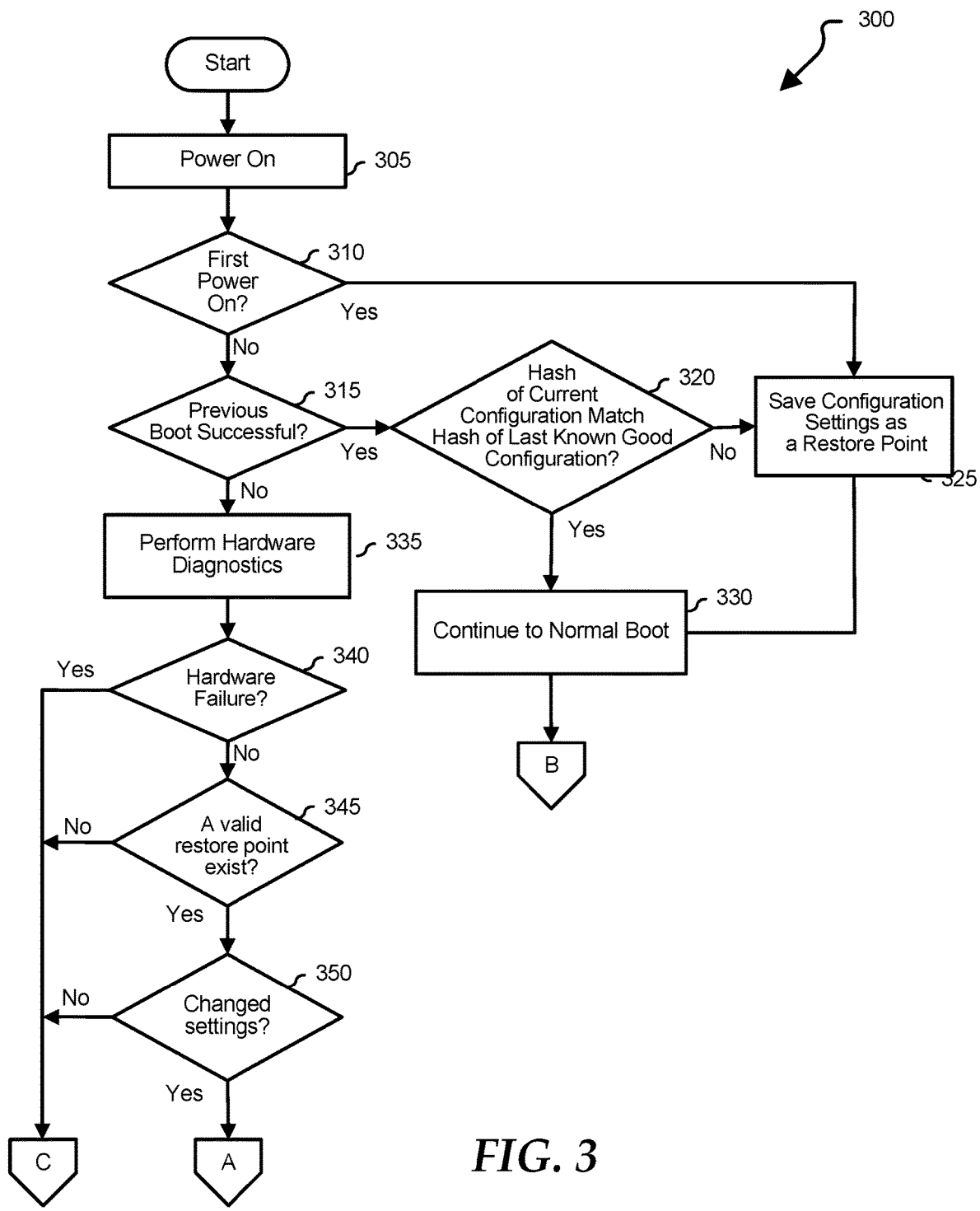
FIGS. 3 and 4 are flow diagrams illustrating a method for automatic recovery of an information handling system; and The use of the same reference symbols in different drawings indicates similar or identical items.

FIG. 3 illustrates a method 300 for automatic recovery of an information handling system based on most recent known good configuration settings to remediate configuration issues. The method 300 typically starts at block 305 where a user turns the power-on at the information handling system supplying current to the information handling system. The information handling system begins operation and a decision is made as to whether the power-on at the information handling system is an initial power-on of the information handling system that is the information handling system is turned on for the first time, in decision block 310. If the power-on is the initial power-on of the information handling system, then the "YES" branch of decision block 310 is taken and the method proceeds to block 325 as described below. If the power-on is not the initial power-on of the information handling system, then the "NO" branch of decision block 310 is taken and the method proceeds to decision block 315.

At block 325, the method retrieves the current configuration settings and stores the most recent configuration settings as a "last known good" restore point or most recent known good restore point in an indicated NV-RAM slot which may be referred to as a recovery region. If this is the initial power-on, the current configuration settings may be stored as a factory restore point instead. One or more useable or good restore points may be stored in the recovery region. For example, the restore points may include a basic restore point that has configuration settings with known safe values and the factory restore point that has configuration settings used at shipment of the information handling system from its manufacturer. The restore points also include known good restore points that include configuration settings known to successfully support startup of the information handling system. Access to the restore point may be enforced with password protection to prevent unauthorized access.

Typically, the memory storing the configuration settings such as the recovery region is checksummed or otherwise checked for validity before application to the information handling system at boot. Although a checksum will typically detect spurious or incomplete changes to configuration information, it generally cannot ensure that the configuration information describes a viable configuration. Thus, configuration settings are stored first in the provisional region until after the information handling system is successfully booted. After the information handling system is successfully booted, the configuration settings are moved to the non-provisional region of the recovery region. The configuration settings may also be stored in a recovery region in an ESP partition of an HDD which may be also be copied to a cloud storage location. The method proceeds to block 330. At block 330, the method continues to boot the information handling system normally and the method ends.

At decision block 315, a decision is made on whether the previous boot is successful. The decision may be made based on a value of a SimpleBootFlag global variable for example. If the previous boot is successful, then the "YES" branch of decision block 315 is taken and the method proceeds to decision block 320. If the previous boot is not successful, then the "NO" branch of decision block 315 is taken and the method proceeds to block 335. At block 335, the method performs hardware diagnostics. For example, BIOS/EFI module may run various diagnostic utilities to determine if the boot failure is due to a hardware failure. For example, the method may examine resources such as memory 120, disk controller 150, and HDD 154 resources to determine if a hardware reason exists for the OS boot problem. Thus, block 335 is designed to verify the hardware state of the information handling system.

Figure 4:
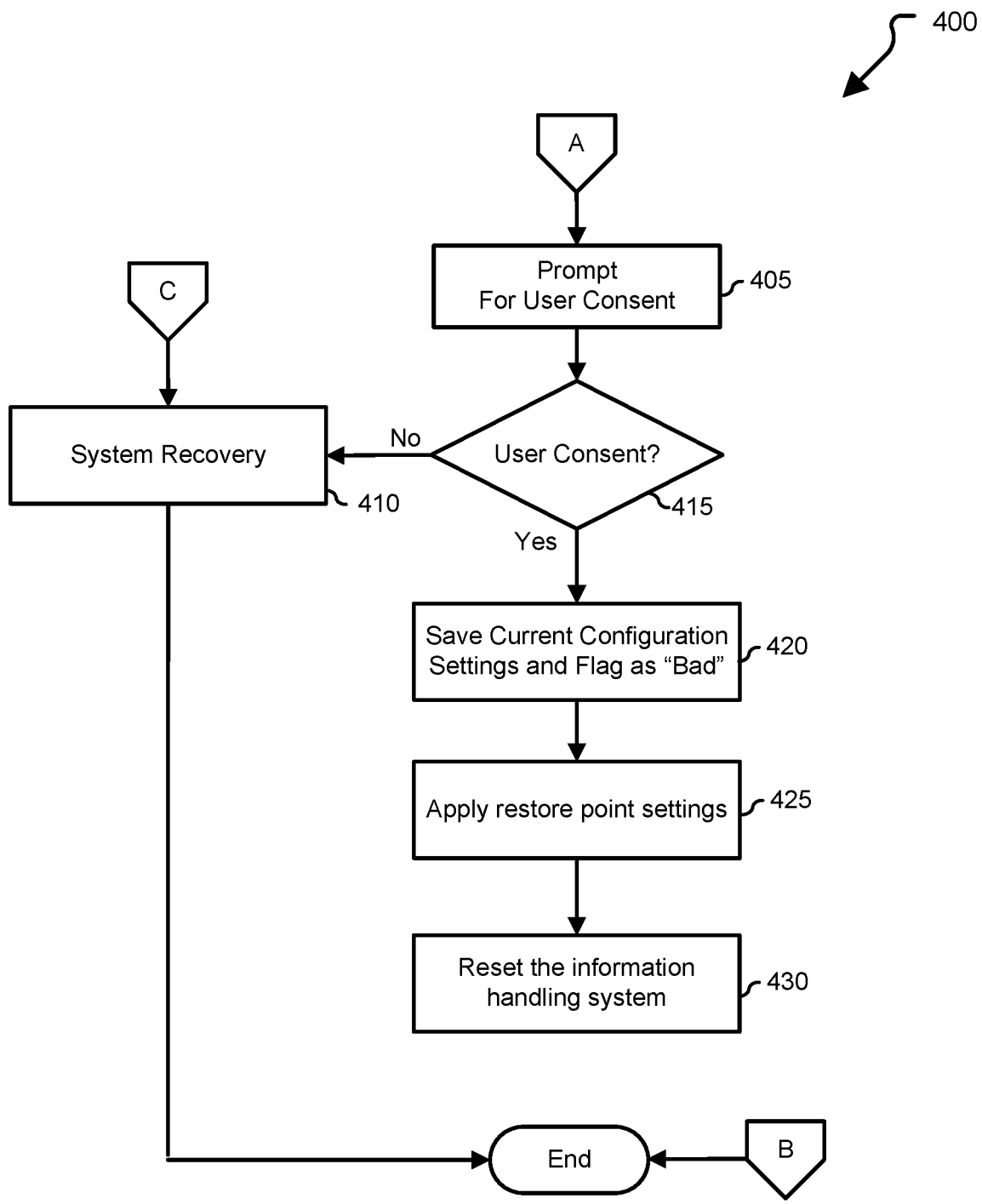

A decision is made as to whether or not the failure is a hardware failure in decision block 340. If so, the "YES" branch of decision block 340 is taken and the method proceeds to block 410 of FIG. 4 as described below. FIG. 4 illustrates a method 400 which is a continuation of method 300. If the failure is not a hardware failure, the "NO" branch of decision block 340 is taken and a decision is made as to whether or not a valid restore point exists at decision block 345. If a valid restore point does not exist, the "NO" branch of decision block 345 is taken and the method proceeds to block 410 of FIG. 4 as described below. If so, the "YES" branch of decision block 345 is taken and a decision is made as to whether configuration settings have changed at decision block 350. If the configuration settings have not changed, then the "NO" branch of decision block 350 is taken and the method proceeds to block 410 of FIG. 4 as described below. If the configuration settings have changed, then the "YES" branch of decision block 350 is taken and the method prompts the user for consent at block 405 of FIG. 4.

At block 410, the method attempts to recover the information handling system. Attempts to recover the information handling system includes troubleshooting common issues that may occur before the information handling system boots to the operating system. The method may also attempt to create a copy of the personal files to an external storage. The method may attempt various known recovery techniques. Afterwards, the method ends.

At block 405, the method displays the result of the performed hardware diagnostics and prompts the user for an input on whether to allow applying the restore point, which is to restore the information handling system to the most recent known good configuration settings. The method may also ask the user to select a restore point to be applied to the information handling system, which is to restore the information handling system to one of known good configuration settings. The method may retrieve the displayed information from one or more storage devices such as the NV-RAM, the HDD-ESP and/or the cloud storage. The method proceeds to decision block 415 where a decision is made on whether or not the user consents to apply the restore point settings. If the user does not consent, the "NO" branch of decision block 415 is taken and the method proceeds to block 410. If the user consents, the "YES" branch of decision block 415 is taken and the method proceeds to block 420. At block 420, the method saves the current configuration settings at an NV-RAM and flagged as "bad" or invalid.

At block 425, the method loads and applies the selected configuration settings from the recovery partition of the NV-RAM slot to the information handling system and the process continues to block 430 as described below. For example, the method may apply the restore point with the most recent known good configuration settings. The method may also load and apply the selected configuration settings from the recovery partition of the HDD-ESP or from the cloud storage. Generally, the selected configuration settings are checksummed or otherwise checked for validity before application to the information handling system. At block 430, the method resets the information handling system based on the applied configuration settings. After resetting the information handling system, the method continues to boot the information handling system.

In another embodiment, the user may be prompted to provide consent to generate restore points prior to saving the known good configuration settings. For example, the information handling system may provide a checkbox for the user to opt-in and authorize the ability to generate restore points for the BIOS settings. The user may be prompted after the decision is made that the power-on is the initial power-on of the information handling system and before saving the configuration settings are a restore point. The user may also be prompted to register the information handling system which may be used to identify configuration settings associated with the information handling system, such as when the configuration settings are saved in the cloud. The user may also be provided with the ability to withdraw his or her consent and/or delete known good configuration settings that have been saved. In addition, in yet another embodiment the user may be prompted for consent after detecting that the hash of current configuration settings does not match the hash of the most recent known good configuration savings in decision block 320 and before saving the configuration settings as a restore point at block 325.

In the flow diagrams of FIGS. 3 and 4, each block represents one or more operation that can be implemented in hardware, software, or a combination thereof. In the context of software, the blocks represent computer-executable instructions that, when executed by one or more processors, cause the processors to perfume the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the method 300 and the method 400 is described with reference to FIG. 2 as described above, although other models, frameworks, systems, and environments may implement these processes.

Although FIGS. 3 and 4 show example blocks of method 300 and method 400, in some implementation, method 300 and method 400 may include additional blocks, fewer blocks, different blocks, or differently arranged blocks than those depicted in FIGS. 3 and 4. Additionally, or alternatively, two or more of the blocks of method 300 or method 400 may be performed in parallel. For example, although method 300 typically starts at block 305, subsequent to the first power-on a flag may be set and the method may start at decision block 315 instead. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   determining, by a processor while booting an information handling system, whether a previous boot of the information handling system was successful;
   in response to the determining that the previous boot of the information handling system was successful, determining whether current configuration settings of the information handling system match most recent known good configuration settings;
   in response to the determining that the current configuration settings of the information handling system do not match the most recent known good configuration settings, storing the current configuration settings as a most recent restore point in a non-volatile memory of the information handling system;
   determining whether the previous boot of the information handling system is an initial boot of the information; and
   in response to determining that the previous boot of the information handling system is the initial boot of the information handling system, storing the current configuration settings as a factory restore point.

2. The method of claim 1, further comprising determining a hash of the current configuration settings prior to the storing of the current configuration settings as the most recent restore point.

3. The method of claim 1, further comprising determining whether a hash of the current configuration settings matches with a particular hash of the most recent known good configuration settings.

4. The method of claim 1, further comprising prior to the storing the current configuration settings as the most recent restore point, determining whether a hash of the current configuration settings matches a particular hash of the most recent known good configuration settings.

5. The method of claim 1, wherein the storing the current configuration settings as the most recent restore point is subsequent to determining that a hash of the current configuration settings does not match a particular hash of the most recent known good configuration settings.

6. The method of claim 1, subsequent to the storing of the current configuration settings as the most recent known good configuration settings, deleting the current configuration settings.

7. The method of claim 1, further comprising storing deltas between current configuration settings and the most recent known good configuration settings.

8. The method of claim 1, further comprising initiating boot of the information handling system based on the most recent known good configuration settings.

9. The method of claim 1, wherein a first storage location of the current configuration settings in the non-volatile memory is distinct from a second storage location of the most recent known good configuration settings in the non-volatile memory.

10. The method of claim 1, wherein the most recent known good configuration settings is a most recent known good restore point of the information handling system.

11. The method of claim 1, further comprising determining whether a good known restore point is stored in the non-volatile memory of the information handling system.

12. The method of claim 1, further comprising applying a most recent known good restore point to operate the information handling system.

13. An information handling system, comprising:
    a non-volatile memory; and
    a processor configured to:
       determine whether a previous boot of the information handling system was not successful while booting the information handling system;
       if the previous boot of the information handling system was not successful, then to determine whether current configuration settings of the information handling system have changed; and
       if the current configuration settings of the information handling system have changed, then to store the current configuration settings and flag the current configuration settings as bad; and
       apply a restore point with most recent known configuration settings to the information handling system.

14. The information handling system of claim 13, wherein the processor is further configured to determine user consent prior to the application of the restore point with the most recent known good configuration settings to the information handling system.

15. The information handling system of claim 13, wherein a region in a storage device that stores configuration settings is secure and tamper-proof.

16. The information handling system of claim 13, further comprising resetting the information handling system based on the most recent known good configuration settings.

17. A method comprising:
   determining, by a processor, while booting an information handling system, whether a previous boot of the information handling system was successful;
   in response to the determining that the previous boot of the information handling system was not successful, determining whether current configuration settings of the information handling system have changed;

in response to the determining that the current configuration settings of the information handling system have changed, storing the current configuration settings and flagging the current configuration settings as bad; and applying a restore point with most recent known good configuration settings to the information handling system.

18. The method of claim 17, further comprising determining user consent prior to the applying the restore point with the most recent known good configuration settings to the information handling system.

* * * * *